United States Patent [19]

Livera

[11] 4,255,642
[45] Mar. 10, 1981

[54] METHOD AND APPARATUS FOR TIPPING OFF REFRACTORY METAL TUBULATION

[75] Inventor: Phillip A. Livera, Bloomfield, N.J.

[73] Assignee: Westinghouse Electric Corp., Pittsburgh, Pa.

[21] Appl. No.: 34,313

[22] Filed: Apr. 30, 1979

[51] Int. Cl.³ .............................................. B23P 1/00
[52] U.S. Cl. ........................................ 219/68; 72/76; 72/402
[58] Field of Search .................. 72/76, 402, 403, 452; 219/68

[56] References Cited

U.S. PATENT DOCUMENTS

| | | | |
|---|---|---|---|
| 936,166 | 10/1909 | Riehl | 72/402 |
| 2,514,507 | 7/1950 | Mueller | 72/402 |
| 3,149,509 | 9/1964 | Oquist et al. | 72/452 |
| 3,183,704 | 5/1965 | Smith | 72/402 |
| 3,938,364 | 2/1976 | Ragard et al. | 72/402 |

Primary Examiner—Lowell A. Larson
Attorney, Agent, or Firm—B. R. Studebaker

[57] ABSTRACT

A method and apparatus for tipping off the refractory metal tubulation of a high pressure sodium discharge lamp arc tube including a machine which repetitively squeezes the tubulation through two pairs of sequentially reciprocating jaws to mechanically swage the tubulation to a reduced diameter prior to electrical flashing to cause separation and sealing off of the tubulation.

12 Claims, 5 Drawing Figures

METHOD AND APPARATUS FOR TIPPING OFF REFRACTORY METAL TUBULATION

BACKGROUND OF THE INVENTION

In the manufacture of the arc tube for a high pressure sodium discharge lamp it is necessary that the tubulation, which extends through at least one of the end caps to permit the evacuation and filling of the arc tube with the discharge sustaining medium, be effectively hermetically sealed off to complete the arc tube manufacturing process.

An effective and commercially feasible method for sealing off the refractory metal tubulation of a high pressure sodium discharge lamp arc tube is disclosed in U.S. Pat. No. 3,566,067 to Daniel A. Larson in which two sets of pinching jaws are employed, the first to flatten a section of the tubulation and the second to provide a narrowly pinched section which will serve as a point of separation when a predetermined electrical current is passed through the tubulation. Although this method of sealing off the refractory metal exhaust tubulation of a ceramic arc tube has proved reasonably successful, in some instances because of the very thin section of tubulation at the point of separation and the current levels necessary to cause the melting and separation, some of the metal in this thin area is flashed away resulting, in some instances, in unreliable seals.

An improvement on this method of tipping off the refractory metal tubulation of the high pressure sodium discharge lamp arc tube is disclosed in U.S. Pat. No. 4,117,299, issued to John Petro et al., which discloses a single four-directional crimp of the tubulation to form an X-shaped cross section. This latter method provided more metal in the area of the electrical resistance separation and provided an improved seal.

Although the foregoing methods reduced the tube diameter at the parting location significantly, the use of a single force to move the metal to a different shape and size provided some weakening and distortion of the metal structure, causing fine cracks both along the melted edge as well as in the remainder of the heavily squeezed area and in some instances has been the source of lamp failures.

SUMMARY OF THE INVENTION

In accordance with the present invention the metal exhaust tubulation is moved from its initial size to a pinched off condition slowly through a plurality of repetitive swaging operations to reduce the diameter of the tubulation to approximately 30% of its original size. In accordance with the present invention the refractory metal tubulation of the arc tube of a high pressure sodium discharge lamp is tipped off after the exhaust and fill operations of the arc tube manufacturing process by inserting the tubulation into a machine having a plurality of pairs of radially extending diametrically opposed tipping jaws extending normal to the tubulation. The plurality of radially extending pairs of tipping jaws are activated sequentially with a plurality of rollers having sequentially increasing diameters thereby causing the tipping jaws of said pairs to repetitively squeeze the tubulation into an increasingly smaller diameter. The tubulation is then removed from the machine and sufficient electric current is passed through the tubulation to cause the separation thereof in the area of smallest diameter. Each of the pairs of radially extending diametrically opposed tipping jaws squeeze the tubulation at least 10 times during this process.

The machine for reducing the diameter of the tubulation by the repetitive squeezing action comprises a cylindrical central stationary housing having a plurality of radially extending bores therein. Radially movable elongated tool members or tipping jaws are slidably disposed within each of the radially extending bores with the tool members each having a jaw surface on its interior end and a cam surface on its exterior end. A rotatable housing surrounds the stationary housing and is mounted on and is rotatable about the stationary housing. A plurality of rollers are mounted within the rotatable housing and are constructed and arranged to sequentially contact the cam surfaces on the tool members whereby upon rotation of the rotatable housing about the stationary housing the cam surfaces of the tool members will be contacted sequentially by the rollers causing the jaw surfaces of the tool members to be repetitively driven toward each other thereby applying a squeezing action to a tubular article disposed therebetween. The tool members are disposed in pairs and the axes of the rollers are disposed a uniform distance from the axis of the stationary housing with the rollers divided into sets of rollers of sequentially differing diameters with opposed rollers in each of the sets being the same diameter and move the tool members in each of said pairs an equivalent distance when the diametrically opposed rollers contact the curved cam surfaces of the tool members. The plurality of rollers are also divided into an upper tier of rollers and a lower tier of rollers and each pair of diametrically opposed tool members are contacted by only one of the two tiers of rollers.

The repetitive squeezing or swaging of the tubulation by the opposed tool members reduces the diameter of the tubulation to about 30% of its original diameter, essentially closing off the tubulation mechanically prior to the resistance tip-off accomplished by passing a predetermined electrical current through the tubulation.

BRIEF DESCRIPTION OF THE DRAWING

Many of the attendant advantages of the present invention will become more readily apparent and better understood as the following detailed description is considered in connection with the accompanying drawing in which.

DESCRIPTION OF THE PREFERRED EMBODIMENT

Figure 1:
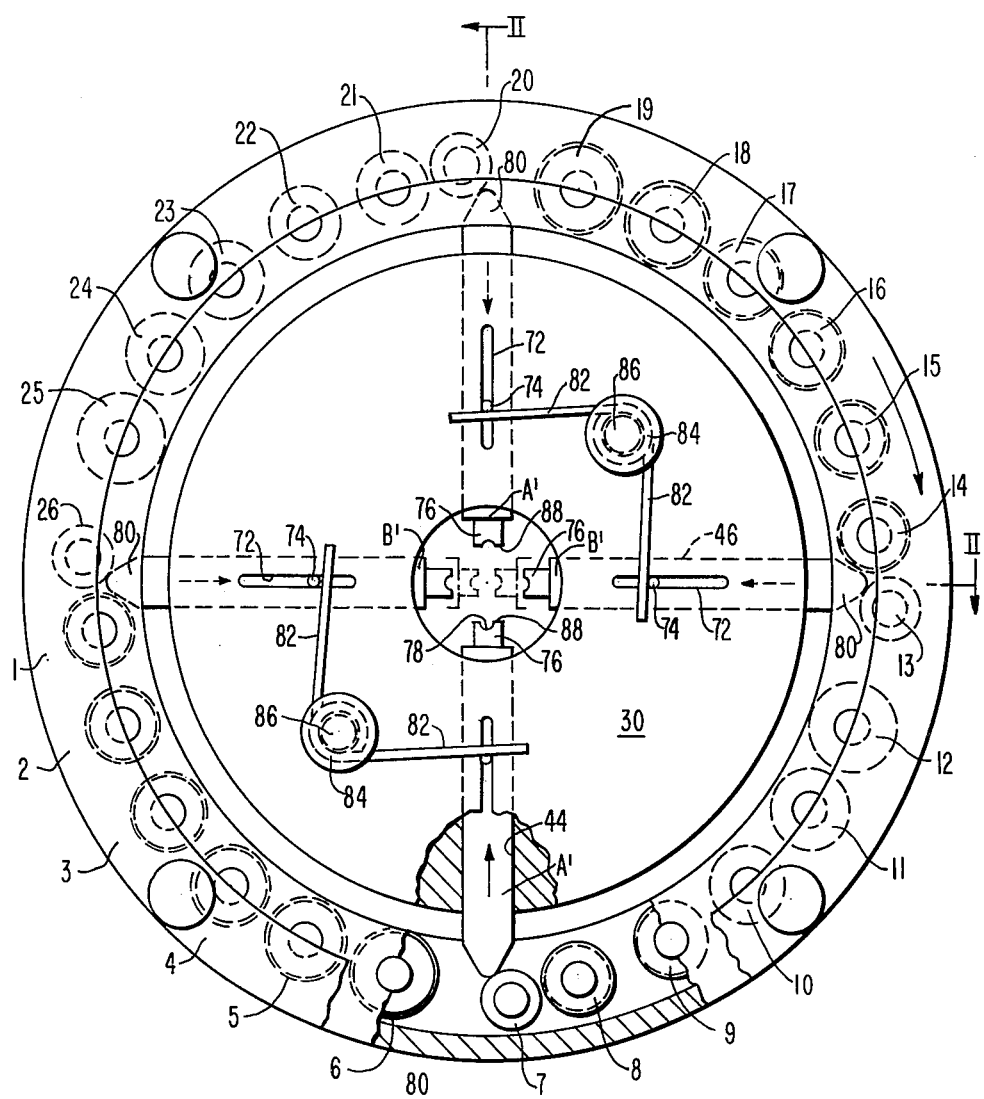
FIG. 1 is a top plan view of the machine of this invention.
Figure 2:
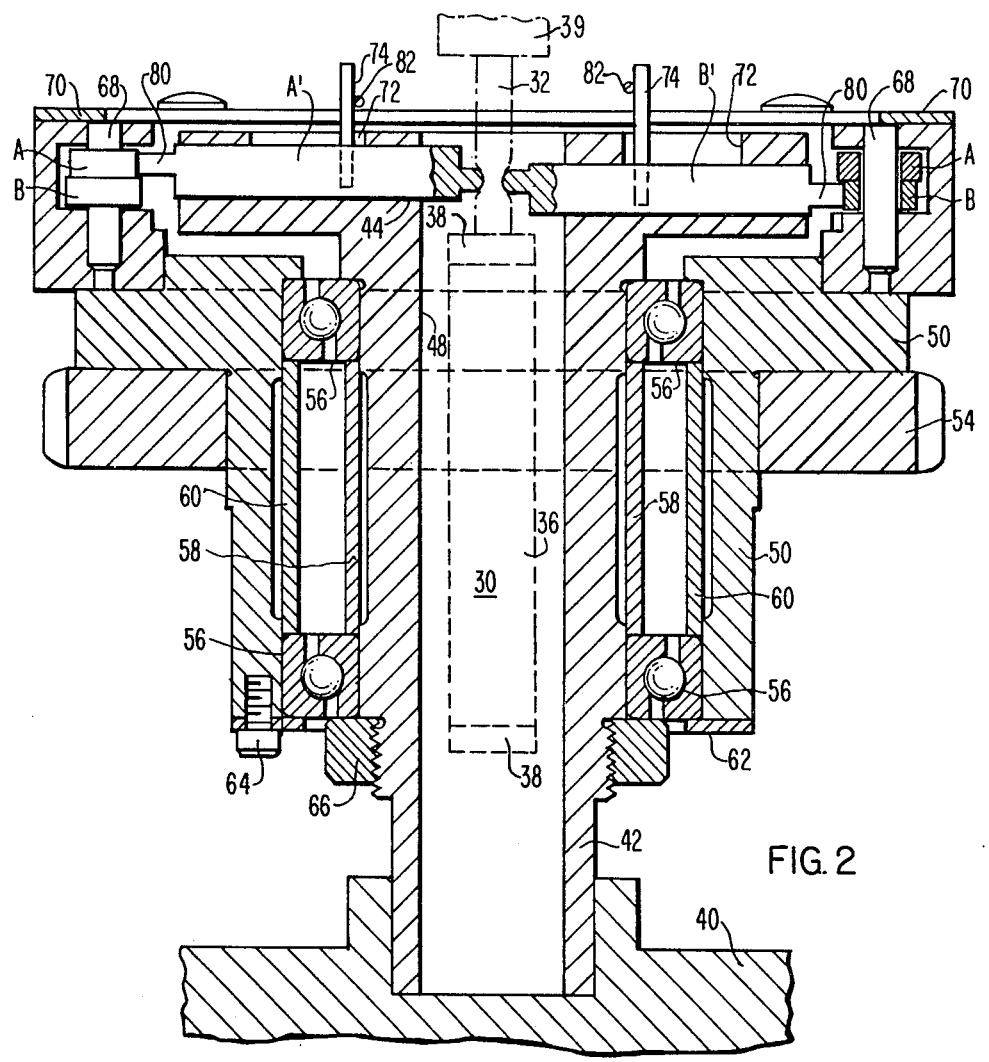
FIG. 2 is a sectional view taken along the line II—II of FIG. 1 modified slightly to illustrate contact of each of the sets of tool members by the actuating rollers associated therewith.
Figure 3:
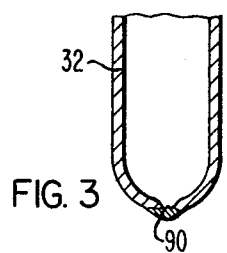
FIG. 3 illustrates a piece of tubulation prior to swaging.
Figure 4:
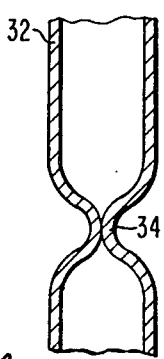
FIG. 4 is a sectional view of the tubulation after swaging by the machine of FIGS. 1 and 2.

Referring now in detail to the drawing wherein like reference characters represent like parts throughout the several views, there is illustrated in FIGS. 1 and 2 a swaging mechanism generally designated 30 which is used to reduce the diameter of a piece of tubulation illustrated in FIG. 3 to the configuration illustrated at 34 in FIG. 4. Although the machine can be used to work many different kinds of metal tubulation the machine of this invention is particularly adapted for use in the tipping off of the refractory metal tubulation of the arc tube of a high pressure sodium discharge lamp.

In the process of manufacturing the arc tube 36 for a high pressure sodium discharge lamp the ends of a polycrystalline alumina arc tube body are generally closed off by an end cap 38 having tubulation 32 extending through at least one end thereof and carrying at its inner end a discharge sustaining electrode. The tubulation permits, during processing of the arc tube body the evacuation of the interior of the arc tube as well as the addition of the discharge sustaining ingredients as for example a rare earth starting gas and a sodium mercury amalgam. After the arc tube has been exhausted and filled with the discharge sustaining ingredients through the exhaust head 39 the tubulation must be sealed off hermetically. U.S. Pat. Nos. 3,566,967 and 4,117,299 are exemplary of methods by which the tubulation of the arc tube may be hermetically sealed. In each of these methods the arc tube is squeezed essentially in one or two steps to a constricted configuration and an electric current sufficient to separate the tubulation at its restricted area is passed therethrough.

In accordance with the present invention, rather than a single crushing press being applied to the tubulation which can affect the metallic structure significantly, a plurality of compressive squeezes are provided by the machine 30 to the tubulation 32 to slowly reduce the tubulation diameter to about 30% of its original diameter. The machine 30 operates on essentially a swaging principle whereby diametrically opposed tipping jaws repetitively squeeze the tubulation to its final configuration.

The machine of this invention includes a base or support 40 for the tipping jaw housing 42. The tipping jaw housing 42 is essentially T-shaped in cross section and carries at its upper end two pairs of diametrically opposed bores 44, 46 which communicate with a cylindrical central opening 48 extending through the tipping jaw housing 42. Each of the diametrically opposed pairs of bores 44, 46 carry slidably therein diametrically opposed tool members or tipping jaws A' and B' respectively.

Surrounding the tipping jaw housing 42 is the tool member or tipping jaw drive mechanism which includes a bearing housing 50, a roller housing ring 52 and a gear drive 54 which are rotatable in unison about the tipping jaw housing through bearing rings 56 spaced one from the other by an inner spacer 58 and an outer spacer 60. A bearing cover plate 62 secured to the bearing housing by bolts 64 and a locking collar 66 threaded to the tipping jaw housing 42 serve to retain the tipping jaw housing, bearings and bearing housing securely together. Journaled in the roller housing ring 52 are a plurality of roller pins 68 which are retained therein by a pin retaining plate 70. On each of the roller pins 68 there is mounted a pair of vertically aligned rollers designated as the upper tier of rollers A and a lower tier of rollers B which operate to actuate respectively tipping jaws A' and B'.

The two tiers of rollers A and B are disposed in four sets, two sets of six and two sets of five which are diametrically opposed and operate to actuate the tipping jaws progressively and sequentially to reduce the diameter of the tubulation 32.

Each of the bores 44, 46 has a slot 72 in the top thereof through which extends a vertically oriented pin 74 which is secured in the respective tool members or tipping jaws A' and B'. Each of the tipping jaws A', B' have on their inwardly extending ends a tipping die 76 with a semi-circular shaped center portion 78 such that when the two tipping dies of the tipping jaws A' meet the cylindrical opening defined by the two semicircular members form the final diameter of the pinch. At the other ends each of the tool members or tipping jaws A', B' include a cam surface 80 which coacts with the various rollers to provide the squeezing operation. The vertically oriented restraining pins 74 are acted upon by the legs 82 of torsion spring 84 mounted on capped studs 86 which serve to thrust the tipping jaws A', B' radially outwardly in the bores 44 and 46 against the rollers.

The operating rollers are designated 1 through 6, 8 through 12, 14 through 19 and 21 through 25 with the rollers 7, 13, 20 and 26 being merely guide rollers to present the cammed surface 80 to the first of the drive rollers of the next sequence. With the exception of the guide rollers 7, 13, 20 and 26 which are single vertically oriented rolls, each of the operating rollers 1 through 6, 7 through 12, 14 through 19 and 21 through 25 include an A tier and a B tier with, for example, rollers A1 and A14 being of the smallest diameter in the A tier while rollers B8 and B21 are of the smallest diameter in the B tier. The rollers having the largest diameter in each of the tiers are rollers A12 and A25 in the A tier and B6 and B19 in the B tier.

In operation, the tubulation is presented to the tipping jaws and the drive gear then drives the roller housing ring through a 180° rotation to accomplish the swaging or squeezing of, for example, a piece of tantalum or niobium tubulation from its original size of 0.125 inch OD with a 0.016 wall thickness to a pinched outside diameter of 0.040 inches.

The following chart is illustrative of a specific example of reducing the outside diameter of a 0.125 inch outside diameter tantalum or niobium tubulation to a 0.040 inch diameter which is also the diameter of the circumferential opening when the dies A' or the dies B' are together. The following chart is illustrative of a specific example giving both the diameters of the operating rollers as well as the space between the outer edges 88 of the respective tipping jaws A' or B' when the tipping jaws are closed to their fullest extent by the particular rollers.

| JAW A' (Operates with top rollers) | | | | JAW B' (Operates with bottom rollers) | | | |
| --- | --- | --- | --- | --- | --- | --- | --- |
| Jaw Position | Operating Rollers | Final Spacing | Diameter of Oper. Rollers | Jaw Position | Operating Rollers | Final Spacing | Diameter of Oper. Rollers |
| Contact | | .100 | .316 | | | | |
| 1st Squeeze | A1 & A14 | .070 | .346 | 2nd Squeeze | B8 & B21 | .070 | .346 |
| 3rd Squeeze | A2 & A15 | .068 | .348 | 4th Squeeze | B9 & B22 | .066 | .350 |
| 5th Squeeze | A3 & A16 | .064 | .352 | 6th Squeeze | B10 & B23 | .060 | .356 |

-continued

| JAW A' (Operates with top rollers) | | | | JAW B' (Operates with bottom rollers) | | | |
|---|---|---|---|---|---|---|---|
| Jaw Position | Operating Rollers | Final Spacing | Diameter of Oper. Rollers | Jaw Position | Operating Rollers | Final Spacing | Diameter of Oper. Rollers |
| 7th Squeeze | A4 & A17 | .058 | .358 | 8th Squeeze | B11 & B24 | .052 | .364 |
| 9th Squeeze | A5 & A18 | .050 | .366 | 10th Squeeze | B12 & B25 | .042 | .374 |
| 11th Squeeze | A6 & A19 | .042 | .374 | 12th Squeeze | B1 & B14 | .034 | .382 |
| 13th Squeeze | A8 & A21 | .034 | .382 | 14th Squeeze | B2 & B15 | .028 | .388 |
| 15th Squeeze | A9 & A22 | .026 | .390 | 16th Squeeze | B3 & B16 | .022 | .394 |
| 17th Squeeze | A10 & A23 | .018 | .398 | 18th Squeeze | B4 & B17 | .016 | .400 |
| 19th Squeeze | A11 & A24 | .010 | .406 | 20th Squeeze | B5 & B18 | .008 | .408 |
| 21st Squeeze | A12 & A25 | 0 | .416 | 22nd Squeeze | B6 & B19 | 0 | .416 |

Figure 5:
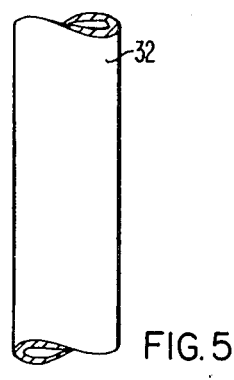
FIG. 5 illustrates the tubulation after sufficient electrical current has been passed therethrough to cause separation.

As will be seen from the foregoing, a 180 degree operation of the machine of this invention will cause the 44 operating rollers to squeeze the tubulation 22 times, 11 times by the A' tool members or tipping jaws and 11 times by the B' tool members or tipping jaws to provide for essential the complete closure of the hollow tubulation. The tubulation is then mounted in a conventional jig or indexed to the next position by an automatic machine and the tubulation contacted electrically on each side of the pinch in order that, in the conventional and well-known fashion, sufficient electrical current can be passed through the tubulation to cause heating at the high resistance area occasioned by the pinch to cause electrical separation at that point as illustrated in FIG. 5 at 90.

It will be apparent that in a completely automated system two arc tubes may be pinched off by the machine of this invention during one complete revolution of the roller housing ring 52. For example, when operating rollers B6 and B19 complete the final squeeze on a first tubulation and it is replaced by the next, guide rollers 26 and 13 will be in position to present operating rollers A1 and A14 to the tool member or tipping jaw A' opposite from the one upon which they operated during the first 180° of rotation during the processing of the first tubulation, thus starting a complete new sequence of 22 squeezes of a second tabulation during the final 180° of a complete revolution.

I claim:

1. A method for tipping off the arc tube refractory metal tubulation of a high pressure sodium discharge lamp comprising the steps of:
    inserting the tubulation into a machine having a plurality of pairs of radially extending diametrically opposed tipping jaws extending normal to said tubulation;
    actuating said plurality of radially extending pairs of tipping jaws sequentially with a plurality of rollers having sequentially increasing diameters thereby causing said tipping jaws of said pairs to repetitively squeeze said tubulation into an increasingly smaller diameter;
    removing said tubulation from said machine and passing sufficient electric current through said tubulation to cause separation thereof at said area of smaller diameter.

2. The method of claim 1 wherein each of said pairs of radially extending diametrically opposed tipping jaws squeeze said tubulation at least 10 times.

3. A machine for reducing the diameter of a tubular article at a particular location by a repetitive squeezing action, said machine comprising;
    a cylindrical central stationary housing having a plurality of radially extending bores therein;
    radially movable elongated tool members slidable within each of said radially extending bores, said tool members each having a jaw surface on its interior end and a cam surface on its exterior end, said tool members being diametrically opposed in pairs;
    a rotatable housing surrounding said stationary housing, said rotatable housing being mounted on and rotatable about said stationary housing; and
    a plurality of rollers mounted within said rotatable housing constructed and arranged to sequentially contact said cam surfaces on said tool members, said rollers being disposed a uniform distance from the axis of said stationary housing in sets of rollers of sequentially differing diameters, whereby upon rotation of said rotatable housing about said stationary housing said cam surfaces of said tool members of each of said pairs will be contacted sequentially by said rollers causing said jaw surfaces of said tool members of each of said pairs to be repetitively driven toward each other thereby applying a squeezing action to a tubular article disposed therebetween.

4. The machine according to claim 3 wherein diametrically opposed rollers in each of said sets are of the same diameter and move said tool member in each of said pairs an equivalent distance when said diametrically opposed rollers contact the cam surface of said tool members.

5. The machine according to claim 3 wherein four radially extending bores are located in said stationary housing, each of said bores extending at 90 degrees from its adjacent bores.

6. The machine according to claim 4 wherein said plurality of rollers include an upper tier of rollers and a lower tier of rollers and said diametrically opposed tool members are contacted by only one of said tiers of rollers.

7. A method for tipping off the arc tube refractory metal tubulation of a high pressure sodium discharge lamp comprising the steps of:
    inserting the tubulation into a machine having two pairs of radially extending diametrically opposed tool members extending normal to said tubulation;
    actuating each of said pairs of radially extending tool members sequentially with a plurality of rollers having sequentially increasing diameters thereby causing said tool members of each pair to be moved toward each other to repetitively squeeze said tubulation into an increasingly smaller diameter;
    removing said tubulation from said machine and passing sufficient electric current through said tubulation to cause separation thereof at said area of smaller diameter.

8. The method of claim 7 wherein each of said pairs of radially extending diametrically opposed tool members squeeze said tubulation at least 10 times.

9. A machine for reducing the diameter of a tubular article at a particular location by a repetitive squeezing action, said machine comprising;
- a central stationary housing having a plurality of radially outwardly extending bores therein communicating with a cylindrical central opening;
- radially movable elongated tool members slidable within each of said radially extending bores, said tool members each having a jaw surface on its interior end and a cam surface on its exterior end, said tool members being diametrically opposed in pairs;
- a rotatable housing surrounding said stationary housing, said rotatable housing being mounted on and rotatable about said stationary housing; and
- a plurality of rotatably mounted rollers mounted within said rotatable housing with the axes of said rollers disposed a uniform distance from the centerline of said stationary housing, said rollers being in sets of rollers of sequentially differing diameter and constructed and arranged to sequentially contact said cam surfaces on said tool members whereby upon rotation of said rotatable housing about said stationary housing said cam surfaces of said tool members of each of said pairs of tool members will be contacted sequentially by said rollers causing said jaw surfaces of said tool members of each of said pairs to be repetitively driven toward each other thereby applying a squeezing action to a tubular article disposed therebetween.

10. The machine according to claim 9 wherein diametrically opposed rollers in each of said sets are of the same diameter and move said tool member in each of said pairs an equivalent distance when said diametrically opposed rollers contact the cam surface of said tool members.

11. The machine according to claim 9 wherein four radially extending bores are located in said stationary housing, each of said bores extending at 90 degrees from its adjacent bores.

12. The machine according to claim 10 wherein said plurality of rollers include an upper tier of rollers and a lower tier of rollers and said diametrically opposed tool members are contacted by only one of said tiers of rollers.

* * * * *